United States Patent Office 2,977,325
Patented Mar. 28, 1961

2,977,325

PROCESS FOR PRODUCING ACTIVATED CHARCOAL

Klaus Feustel, Friedrich Johswich, and Heinrich Stratmann, Essen, Germany, assignors to Reinluft G.m.b.H., Essen (Ruhr), Germany, a limited-liability company of Germany No Drawing. Filed Nov. 10, 1958, Ser. No. 772,732

Claims priority, application Germany Nov. 13, 1957

3 Claims. (Cl. 252—445)

Our present invention relates to a process for making activated charcoal from a suitable carbonaceous starting material, such as lignitic, bituminous or anthracitic coke, obtained through destructive distillation of organic substances.

It is known to produce activated charcoal by subjecting the carbonaceous starting material to a treatment with agents capable of reacting with the carbon and forming volatile substances which leave voids in the carbonaceous mass and increase its effective surface, thereby enhancing the suitability of the material for various physical and chemical uses (e.g. as an absorbent).

Conventional processes of this description generally require a series of relatively complicated steps and often consume a large proportion of the original carbon in the treatment, the yield in activated charcoal being correspondingly diminished. Our invention has for its object the provision of an improved process by which the residue from the destructive distillation of fossil fuels and other organic matter may be converted in a simple and economical manner into a highly active carbonaceous substance.

Fundamentally, our invention resides in the conversion of a very small part of a carbonaceous mass into gaseous, liquid and/or easily soluble carbon compounds, which can readily be separated from the mass, under controlled conditions of temperature and air access, the mass being first thoroughly penetrated by an active agent at a relatively low temperature and being subsequently heated to a relatively high temperature above that at which the carbon reacts with the agent. The duration of each of these steps may range from one or two hours to several days. The active agent should have a boiling point which is higher than its reaction temperature with carbon, the latter ranging generally between 300° C. and 700° C. We have found that, under these conditions, the initial permeation of the carbonaceous mass by the active agent should take place at a temperature less than 150° C. Suitable active agents are acids formed from the higher oxides of nonmetals such as arsenic, phosphorus and sulphur, as well as their anhydrides, and also nonmetals in their elemental form (e.g. sulphur) which are capable of reacting with carbon. The following reactions are representative:

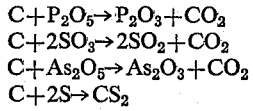

$$C + P_2O_5 \rightarrow P_2O_3 + CO_2$$
$$C + 2SO_3 \rightarrow 2SO_2 + CO_2$$
$$C + As_2O_5 \rightarrow As_2O_3 + CO_2$$
$$C + 2S \rightarrow CS_2$$

The reaction temperatures and the duration of the treatment may be varied, within the limits indicated above, depending upon the starting material and the active agent involved and also upon the desired porosity of the final product. If a higher degree of activation is desired after the treatment has been completed, the cycle may be repeated one or more times.

Example I

Peat coke, drenched with sulphuric acid, is allowed to stand at room temperature for 6 hours. The so permeated carbonaceous mass is then placed in a heating chamber, sealed against the atmosphere and heated to a temperature of 600° C. After two days, following the escape of the developed carbon dioxide and a flushing of the mass to remove the remaining sulphuric acid, a highly active charcoal is obtained.

Instead of sulphuric acid, its anhydride ($SO_3$) or one of the other higher oxides given in the foregoing table may be used in either anhydrous or acidic form. The fourth reaction listed in the table may be produced by means of a solution containing sulphur in a suitable solvent.

If it is desired to produce charcoal in lump or brick form from a comminuted starting material, the active agent may be incorporated in a binder which is admixed with the carbonaceous mass. A particular advantage of this feature of the invention resides in the fact that several cheap waste products are readily available for such purpose. These include notably the by-products of the cellulose and petroleum industries, such as waste-sulphite liquor and the so-called "acid sludge" of refineries.

Example II

Granulated anthracite coke is thoroughly mixed with thickened waste-sulphite liquor, the mixture being stirred for two hours at 80° C. until a thorough intermingling of its components is achieved. The resulting mass is then briquetted and the briquets so formed are treated in an oven, in an oxygen-free atmosphere, for 24 hours at 500° C.

A further feature of the invention resides in the possibility of producing the relatively non-volatile active agents in situ from a gaseous mixture, by a reaction which utilizes the catalytic properties of carbon. Thus, the acids of the higher phosphorus, sulphur and arsenic oxides listed above may be formed from the corresponding, volatile lower oxides $SO_2$, $P_2O_3$, $As_2O_3$. Similarly, elemental sulphur may be deposited in the carbonaceous mass from a mixture of hydrogen sulphide and oxygen.

Example III

A gaseous mixture of sulphur dioxide, air and water vapor is blown over a mass of lignite coke at 120° for 24 hours. Sulphur trioxide is formed in situ within the mass by this process. Next, the mass so treated is placed in an autoclave and treated for 12 hours without air at 650° C. The resulting charcoal is similar to that obtained in accordance with Example I.

The process just outlined enables the re-utilization of the lower oxides separated from the final product whereby the treatment becomes particularly economical. The activated charcoal obtained by any of the afore-described methods corresponds in all respects to that produced by conventional means and can be used in the same manner.

We claim:

1. A process for producing activated charcoal, comprising the steps of permeating a mass of coke with sulphur dioxide at temperatures below 150° C. in the presence of sufficient quantities for oxygen and for a time long enough to convert said sulphur dioxide to sulphur trioxide, and subjecting the material so treated in the absence of air to temperatures ranging from 300° C. to 700° C. for a period sufficient to enable volatilization of a substantial proportion of said coke by reaction with said sulphur trioxide.

2. A process for producing activated charcoal, comprising the steps of permeating a mass of coke with sulphur dioxide at temperatures below 150° C. in the presence of sufficient quantities of water vapor and oxygen and for a time long enough to convert said sulphur dioxide to sulphur trioxide, and subjecting the material so threaded in the absence of air to temperatures ranging from 300° C. to 700° C. for a period sufficient to enable volatilization of a substantial proportion of said coke by reaction with sulphur trioxide.

3. A process according to claim 2 wherein the steps of permeating said mass of coke with sulphur dioxide, in the presence of water vapor and oxygen, and heating the material so treated are repeated at least once.

References Cited in the file of this patent

UNITED STATES PATENTS

| | | |
|---|---|---|
| 1,438,113 | Hudson | Dec. 5, 1922 |
| 1,641,281 | Lueg et al. | Sept. 6, 1927 |
| 1,819,314 | Zurcher | Aug. 18, 1931 |
| 1,968,846 | Morrell | Aug. 7, 1934 |
| 2,191,063 | Smit | Feb. 20, 1940 |